United States Patent [19]

Hays et al.

[11] Patent Number: 4,855,566
[45] Date of Patent: Aug. 8, 1989

[54] PROCESS FOR STRIKING AN ARC IN ELECTRIC WELDING AND WELDING TORCH EMPLOYING SAID PROCESS

[75] Inventors: Jean-Francois Hays, Carrieres-Sur-Seine; Pierre Legrand, Pontoise; Eric Verna, Cergy; Michel Delzenne, Franconville; Bernard Reynaud, L'Isle Adam; Pierre Gaillard, Champigny-Sur-Marne, all of France

[73] Assignee: L'Air Liquide, Paris, France

[21] Appl. No.: 54,272

[22] PCT Filed: Oct. 22, 1986

[86] PCT No.: PCT/FR86/00363

§ 371 Date: Apr. 20, 1987

§ 102(e) Date: Apr. 20, 1987

[87] PCT Pub. No.: WO87/02606

PCT Pub. Date: May 7, 1987

[30] Foreign Application Priority Data

Oct. 25, 1985 [FR] France ................... 85 15363

[51] Int. Cl.$^4$ ............................................. B23K 9/06
[52] U.S. Cl. .................................. 219/130.4; 219/75
[58] Field of Search ............ 219/130.4, 136, 137 PS

[56] References Cited

U.S. PATENT DOCUMENTS 2,612,582  9/1952  Appleton ..................... 219/130.4
3,008,036  11/1961  Greene et al. ............... 219/130.4
4,119,829  10/1978  Bakardjiev et al. .......... 219/130.4

FOREIGN PATENT DOCUMENTS 2052152  4/1971  France .
1146283  3/1969  United Kingdom .
2061035  5/1981  United Kingdom .

OTHER PUBLICATIONS

English translation of French Patent No. 2,052,152 (of record).

Primary Examiner—Clifford C. Shaw
Attorney, Agent, or Firm—Lee C. Robinson, Jr.

[57] ABSTRACT

The invention relates to a process for striking an arc and to a torch employing said process. An electronic ignitor located at a maximum distance of 8 meters from the torch has a high-voltage conductor which leads to a spark gap adjacent the part to be welded. The high-voltage circuit is closed in the region of the zone to be ionized between the welding electrode and the part.

7 Claims, 6 Drawing Sheets

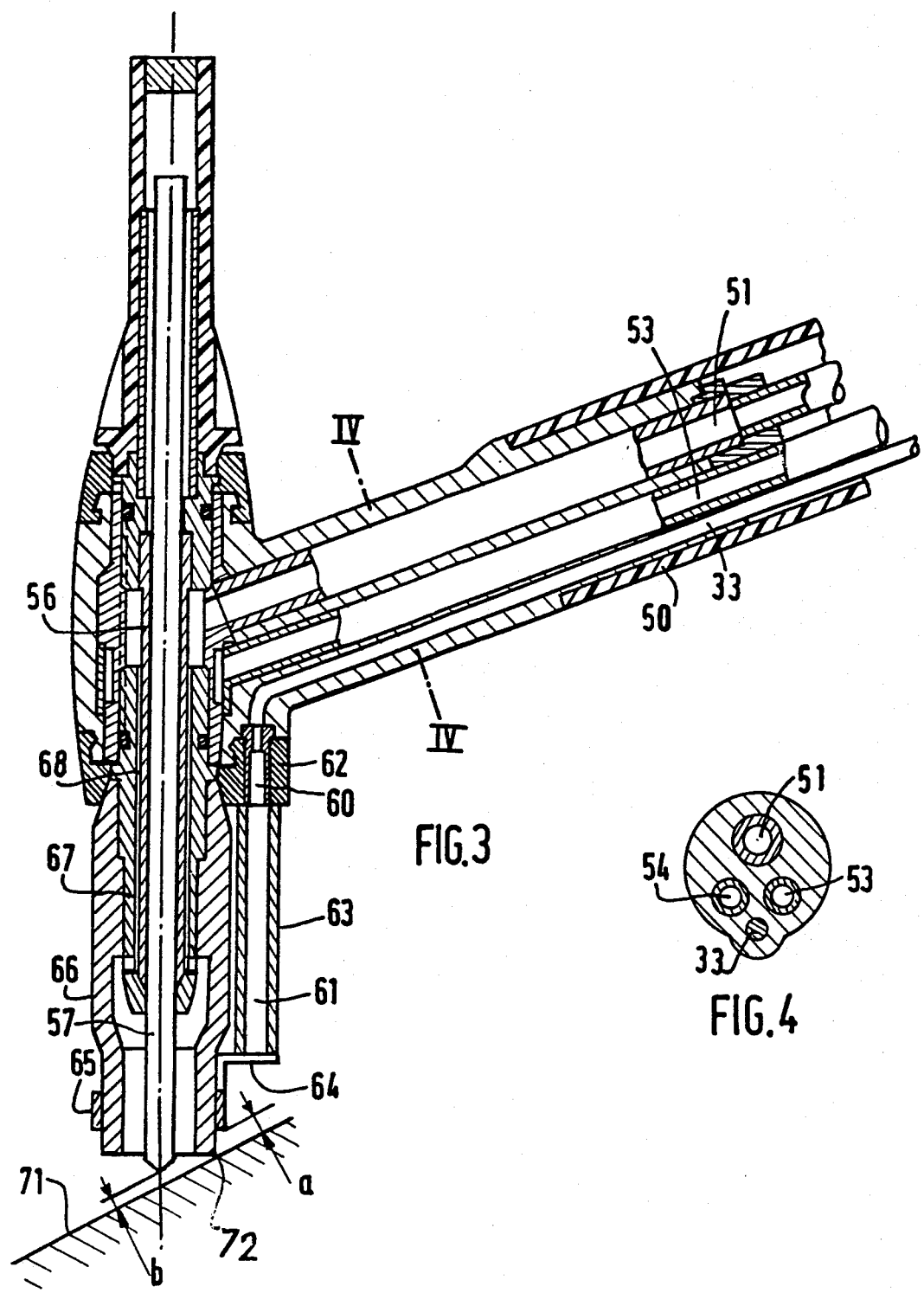

PROCESS FOR STRIKING AN ARC IN ELECTRIC WELDING AND WELDING TORCH EMPLOYING SAID PROCESS

DESCRIPTION

The invention relates to the striking of an electric welding or cutting arc with an electrode and in particular a refractory electrode, of the type comprising producing, between a refractory electrode and either an auxiliary electrode adjacent to said refractory electrode, or a part to be welded or cut, an ionizing discharge of high-voltage electric pulses forming at least one spark from a pulse generator.

Conventionally, the high-voltage electric pulse discharge is produced by means of a high-frequency generator which is of necessity, owing to its weight and overall size, disposed at a distance from the welding torch and is generally more or less integrated with the welding current generator. Such a manner of creating in the region of the refractory electrode a high-frequency electric discharge presents notable drawbacks as concerns the very high cost of the high-frequency generator and the adverse effects on the environment caused by these discharges which produce radio-electric disturbances, in particular as concerns,. telecommunications. and electronic equipment such as encountered in plant automation. Moreover, the effectiveness of the high-frequency discharge is very dependent on the distance between the generator and the torch so that the high-frequency generator must be over-dimensioned in order to take into account the sometimes relatively large distances between the welding station and the welding generator, which still further increases the aforementioned drawbacks.

The use has indeed been proposed of small pulse generators of the electronic ignition type having a capacitive electric charge dischargeable into a step up voltage transformer. In respect of the known proposal, the generator is simply connected between the part to be welded and an auxiliary electrode, and experience has shown that this manner of proceeding does not ignite the arc with certainty.

The present invention provides an arc striking process which avoids any radioelectric disturbance owing to the possibility of considerably reducing the distance between the torch and the generator and therefore the level of the power of the generated pulses; moreover, the cost of the equipment is considerably reduced while ensuring a satisfactory ignition of the arc. According to the invention, the following measures are combined:

(a) the electronic ignitor having a capacitive electric charge dischargeable into a step-up voltage transformer is arranged in such manner that the energy delivered by a spark is on the order of 10 millijoules;

(b) a spark gap is inserted in the discharge circuit of said electronic ignitor;

(c) the distance between the electronic ignitor and the body of the torch is less than a distance on the order of eight metres and preferably on the order of four metres.

According to a preferred form of the invention, the distance between said spark gap and said refractory electrode is less than 0.5 meter, the spark gap being preferably disposed in the region of, or in, the torch body.

By electronic ignitor is meant small spark or spark-train generators incorporating at least one electric capacitor with its charging and discharging means with rise in voltage which are common on the market and in respect of which none of the three dimensions generally exceeds 10 cm and the weight is relatively light, on the order of 100 g to 200 g while the power of a spark is on the order of 10 millijoules. An ignitor of this type is sold by the French firm RV under the commercial name REF 177 "1 or 2 Point Electronic Ignitor." It is one of the merits of the present invention to have noticed that such a small and light generator could be easily added without difficulty in the vicinity of the body of the torch proper, or in the bunch of cables and conduits with which this torch is equipped and whose length generally does not exceed 8 metres. Thus, the fact of being able to place the spark generator on a "mobile" part of the welding equipment and not, as before, in respect of H.F. generators necessarily grounded and more or less integral with the welding generator, permits a substantial reduction in the length of the electric discharge path, which makes it possible to use such ignitors having a very limited power per spark. It has also been found, and this is an essential condition for a good performance of the process, that a spark gap had to be provided in the discharge path to give a spark of sufficiently high energy. Without the disposition of such a spark gap, the discharge would be produced upon each approach or contact of the electrode relative to the part to be welded without presenting the necessary voltage level for the ionization of the gas in the space of the arc-forming zone. This is also a merit of the invention to have discovered experimentally that this spark gap had to be placed rather close to the igniting electrode and in any case at a distance therefrom less than 0.5 m. Beyond this position, the attenuation of the electric discharge is liable to render the ignition of the main arc uncertain.

The invention also concerns an electric welding torch of the type comprising a torch body with a refractory electrode, and an annular conduit coaxial with said electrode for a protection gas, said electrode and said conduit being connected to supply means through a supply bunch incorporating an electric cable for the welding current, a conduit for the protection gas, optional supply and return conduits for a coolant fluid, and control conductors, and this welding torch is characterised in that the electronic ignitor is placed as far away as possible at the end of said bunch which is remote from the torch body, with a spark gap in series.

According to a modification, in the case where the supply bunch connected to the torch body terminates in an element of a "rapid" connector, the electronic ignitor is incorporated in said rapid connector.

The features and advantages of the invention will be apparent from the following description given by way of example with reference to the accompanying drawings, in which:

FIG. 3 is an axial sectional view of a welding torch according to the invention and of a part of its bunch adapted to be connected to the rapid connector shown in FIG. 1;

FIG. 4 is a cross-sectional view taken on line IV—IV of FIG. 3;

Figure 1:
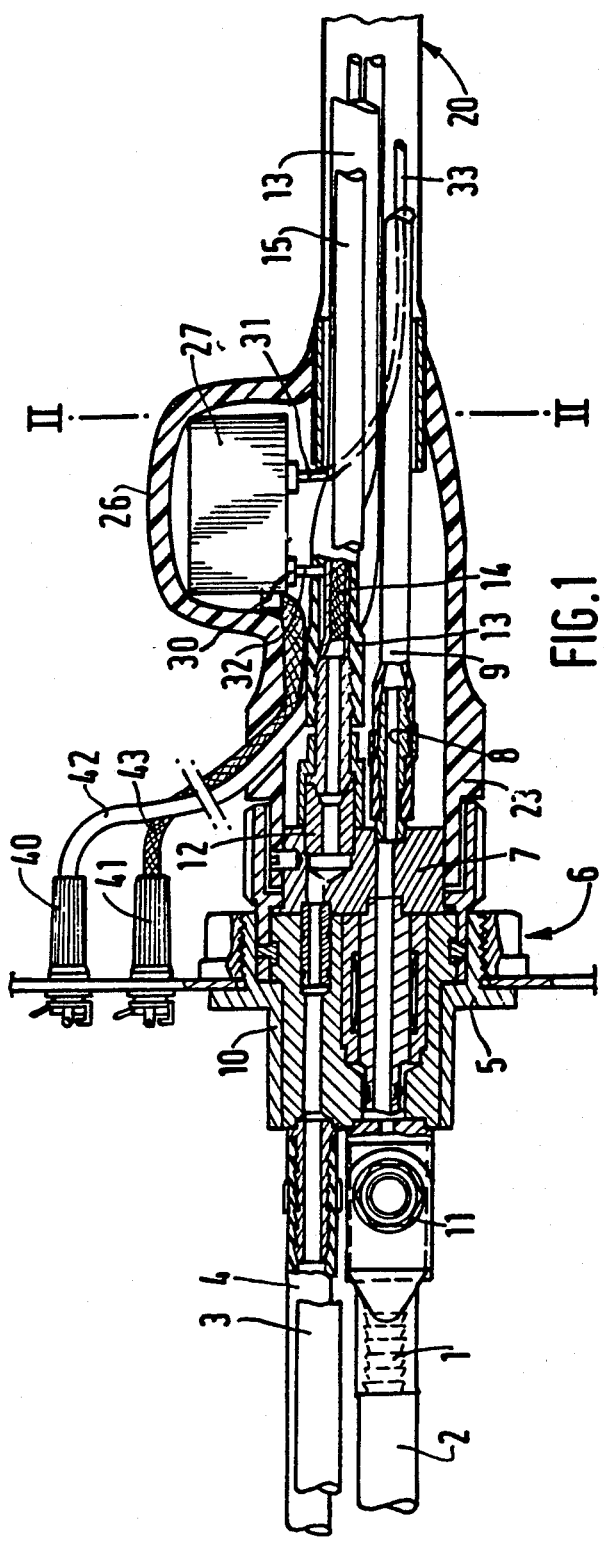
FIG. 1 is an axial sectional view of a rapid connector provided with an electronic ignitor according to the invention.
Figure 2:
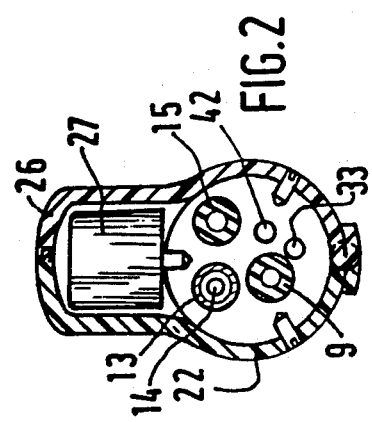
FIG. 2 is a cross-sectional view taken on line II—II of FIG. 1.

With reference to FIGS. 1 and 2, the invention is here applied to a supply device of a torch (described hereinafter with reference to FIGS. 3 and 4) provided with a rapid connector. The supply device comprises, on the side connected to the fixed sources, a current supply cable 1, a conduit 2 for a protection gas, a conduit 3 for a cooling water supply, and a conduit 4 for a cooling water discharge which lead, on the downstream side, to a base 5 of a rapid connector 6 the construction of which will now be rapidly described:

it comprises a passageway 7 for the gas connected to the downstream end of nozzle 8 of a gas conduit 9:

it is mainly formed by metal parts coated with an insulating cover 10 and the welding current cable 1 is connected to a terminal 11 electrically connected to these conductive parts which are also used for the connection of the supply and return of the cooling water. The connection of the return of the cooling water is shown in cross section in the drawing and has a junction 12 with the conduit 4 on which is fixed in a sealed manner a cooling water return conductor 13 incorporating an electric cable 14 electrically connected to the conductive parts so that the welding current supplied through the cable 1 passes through conductive parts to the cable 14.

The water supply connector for a conduit 15 is of the same type but has no electric cable.

The various conduits and conductors 9, 13, 14 and 15 are grouped in a bunch 20 having an insulating cover and there is provided in the upstream end part 22 a rigid plastics case 23 composed of two double shells having a bulge 26 for the incorporation of an electronic ignitor 27 of the type previously referred to. This electronic ignitor 27 has two high-voltage output terminals 30 and 31, the terminal to the welding current cable 14, while the high-voltage terminal 31 is connected to a high-voltage conductor 33 engaged in the bunch of conductors 20.

The base 5 of the rapid connector, which may be the wall of the welding generator, also carries two connectors 40 and 41. The connector 40 serves to connect one or more low-voltage control conductors 42, while the rapid conductor 41 serves to connect two electric wires 43 connected to the low-voltage terminals of the electronic ignitor 27.

The conductor bunch 20, which has a certain flexibility (over a few metres and at the most eight metres), extends to the welding torch which is shown in FIGS. 3 and 4 and will be now described.

Located in a handle 50 of this welding torch are a tube 51 connected to the gas supply conduit 9 and a tube 53 connected to the water return conduit 13, the electric cable 14 being connected by a succession of metal parts to the conductor tube 53 and thence to the electrode holder 56 for an electrode 57. The water supply conduit is represented at 54. The high-voltage conductor 33 continues inside the handle 50 and is connected by a split pin 60 to a metal rod 61, the assembly being electrically protected by a small insulating collar 62 and insulating tube 63. The metal rod 61 is electrically connected through a conductive bracket 64 to a metal nozzle ring 65 which is fixed to the outer surface of a torch nozzle 66 incorporating the electrode holder 56 and a member 67 defining with the electrode holder 56 an annular conduit 68 for the protection gas.

The welding torch operates in the following manner: at the beginning of a welding operation, the operator depresses a trigger (not shown) which produces, owing to the control conductors 42, not only the supply of fluids (cooling water, protection gas) and welding current, but also the connection of the electronic ignitor.

The operator then causes the welding torch to approach the part to be welded 71 and inclines it in such manner that the edge 72 of the nozzle 66 comes into contact with the part 71 and there is produced between the collar 65 and the part 71 a correct distance a on the order of 2 to 8 millimetres which forms with the distance b of the zone to be ionized between the end of the electrode 57 and the part 71 the disruptive distance for the electric discharges. A discharge is produced between this conductive collar 65 and the part 71, which discharge closes onto the electrode 57 which is connected through the conductor 31 (FIG. 1) to the other high-voltage terminal of the electronic ignitor, thereby producing an ionizing spark in the arc-forming space between the end of the electrode 57 and the part 71.

Figure 5:
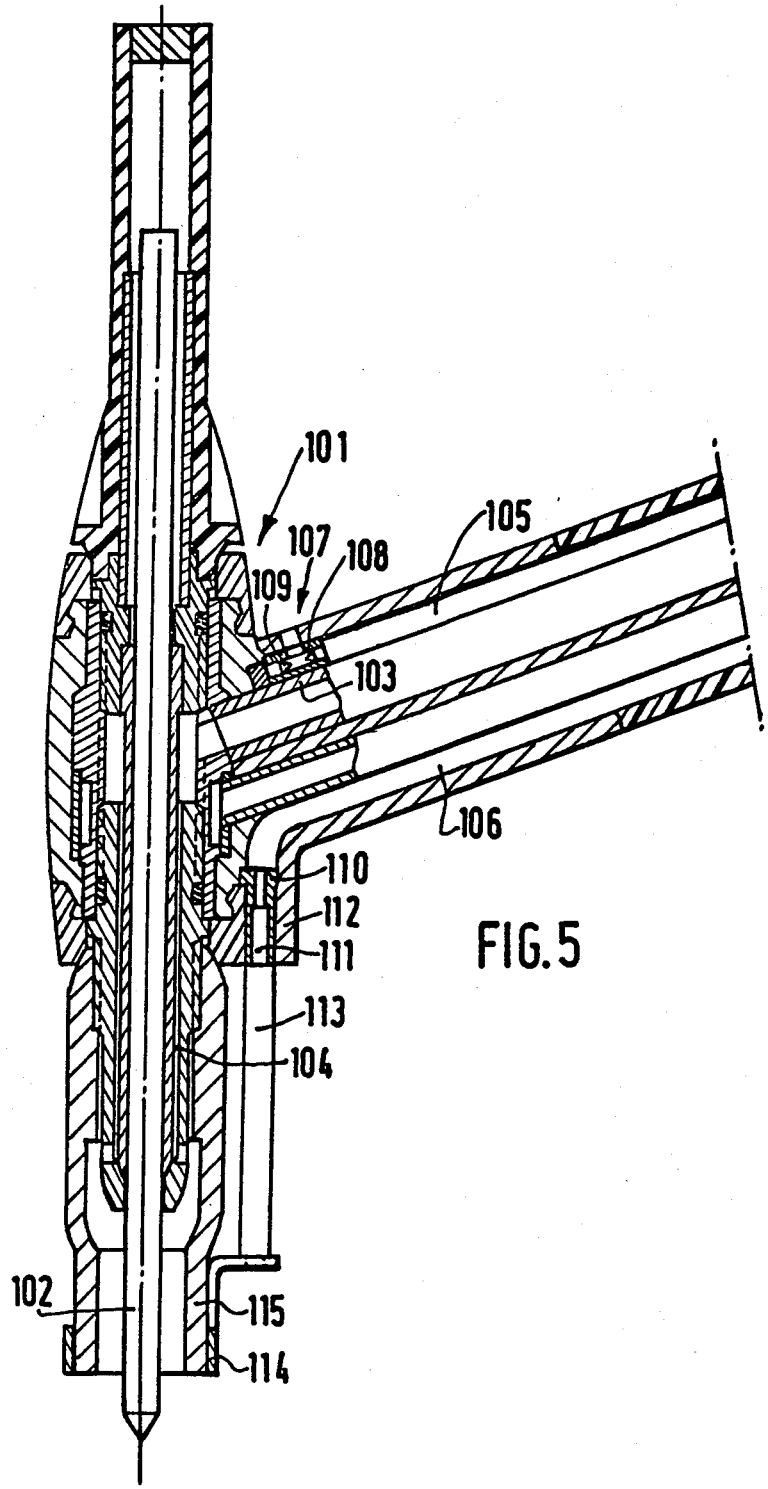
FIG. 5 is a view similar to FIG. 3 of a modification.

According to the embodiment shown in FIG. 5, there are provided, in a torch body 101 having an electrode 102 electrically connected to a tubular conductor 103 for the welding current and also conveying the protection gas flowing in the interstitial space 104, two conductors 105, 106 leading from the electronic ignitor (for example connected to the high-voltage terminals 31 and 32 of the ignitor 27 according to FIG. 1). The conductor 105 leads to a spark gap 107 formed by two metal points 108, 109, the point 108 being at the end of the conductor 105, while the other, 109, is connected by brazing to the tubular conductor 103 for the welding current. The conductor 106 is connected to a socket 110 engaged with a pin 111, the assembly being insulated by an insulating collar 112. The pin 111 is connected by a metal rod 113 to a nozzle ring 114 of conductive material placed in the end region of the nozzle 115 and consequently adapted to come into direct contact with the part to be welded when igniting the arc.

Figure 6:
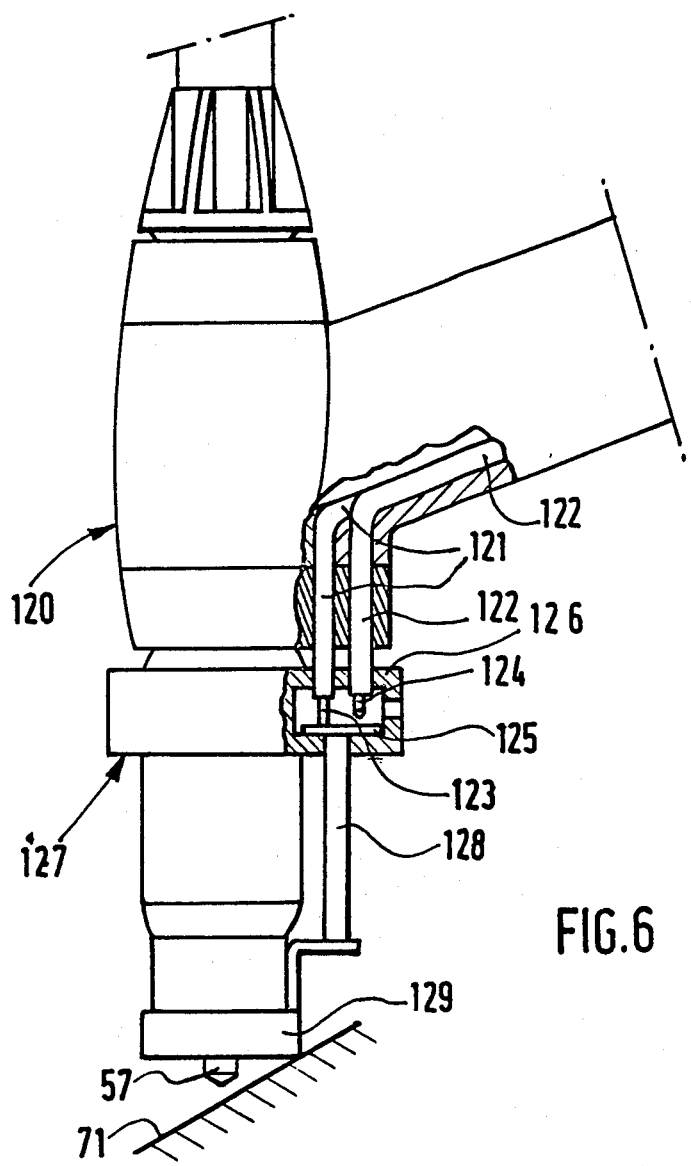
FIGS. 6, 7 and 8 show three other modifications of the invention.

According to the embodiment shown in FIG. 6, there are again provided in the torch 120 two conductors 121, 122 of which the conductor 122 is connected to a high-voltage terminal of the electronic ignitor (as indicated in FIG. 1), the other high-voltage terminal of this ignitor being directly connected to the welding current conductor, as shown in FIG. 1. The conductor 121 is connected to a low-voltage supply terminal of this ignitor while the other low-voltage terminal of the ignitor is connected through a blocking coil to the welding current conductor. In the torch, the conductors 121, 122 have end portions 123, 124 of different lengths facing a conductive plate 125 embedded in an insulating end member 126 of a collar 127, the arrangement being such that the end portion 123 of the conductor 121 is in contact with the plate 125 while the end portion 124 of the conductor 122 is at a sparking distance from this plate 125. The plate 125 is electrically connected to a rod 128 leading to a conductive nozzle collar 129. In operation, as soon as the collar 129 of the torch is made to bear against the part 71 to be welded or cut, the low-voltage supply circuit of the ignitor is closed and a spark or a train of sparks is conducted through the welding current conductor, the ionization space between the electrode 57 and the part 71, the collar 129, the rod 128, the spark gap 124-125 and the conductor 122, the high-voltage discharge being incapable of returning to the input of the electronic ignitor.

Figure 7:
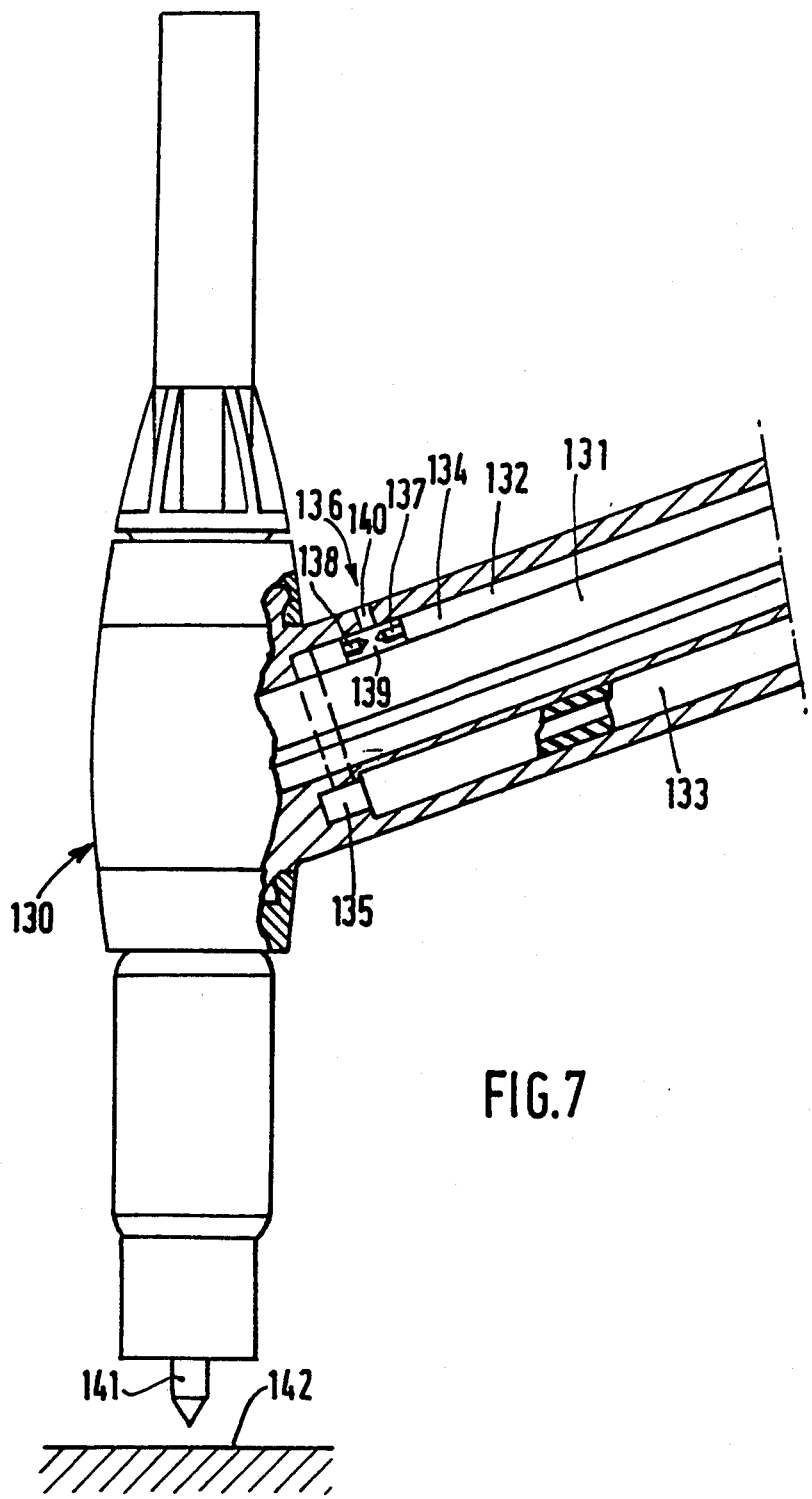

In the embodiment shown in FIG. 7, there are again provided in a torch 130 of the type described with reference to FIG. 5, two high-voltage conductors 132, 133. The conductor 132 extends throughout its length to the electronic ignitor longitudinally in the immediate vicinity of the welding current conductor (tube 131, then the cable which is not shown), while the second high-voltage conductor 133 is spaced further away therefrom and/or shielded. The ends 134 and 135 of the conductors 131 and 132 are interconnected by a spark gap 136 (point 137, 138 in a cavity 139 communicating at 140 with the surrounding air. Here, the high-voltage electric discharge is closed directly onto the electronic ignitor without passing through the space to be ionized in the vicinity of the welding electrode 141. However, there appears between this electrode 141 and the part 142 to be welded an ionizing spark due to an induction effect between the high-voltage conductor 132 and the welding current conductor 131.

In the embodiment shown in FIG. 8, there is again provided a torch 150 with an electrode 152 electrically connected to a tubular conductor 153 for the protection gas flowing in the interstitial space 154. Here, a well-insulated but non-shielded high-voltage conductor 155 is connected by a terminal 156 to a metal member 157, the assembly being placed in a longitudinal cavity 158 which is part of a torch handle 159 having an upstream lateral opening 160 constituting a passageway for the entry of the high-voltage cable and a downstream opening 161 which is in facing relation to the electrode end 162. Placed in facing relation to the metal member 157 constituting a spark gap electrode, is a stud 163 at a sparking distance from the member 157, this stud being electrically connected through a conductive sleeve 164 to the water return tube 165 which constitutes the electric supply conductor of the welding current for the electrode 152.

On test, there is found an excellent operation of the device just described. Very surprisingly, and while at present it is not possible to give a satisfactory explanation, it has been found that it is preferable, in order to obtain an extremely effective ignition, not only to provide an opening 161 in the region of the spark gap 157-163, but also to arrange that this opening 161 be substantially in facing relation to the arc-igniting zone, i.e. in facing relation to the electrode end 162.

Figure 8:
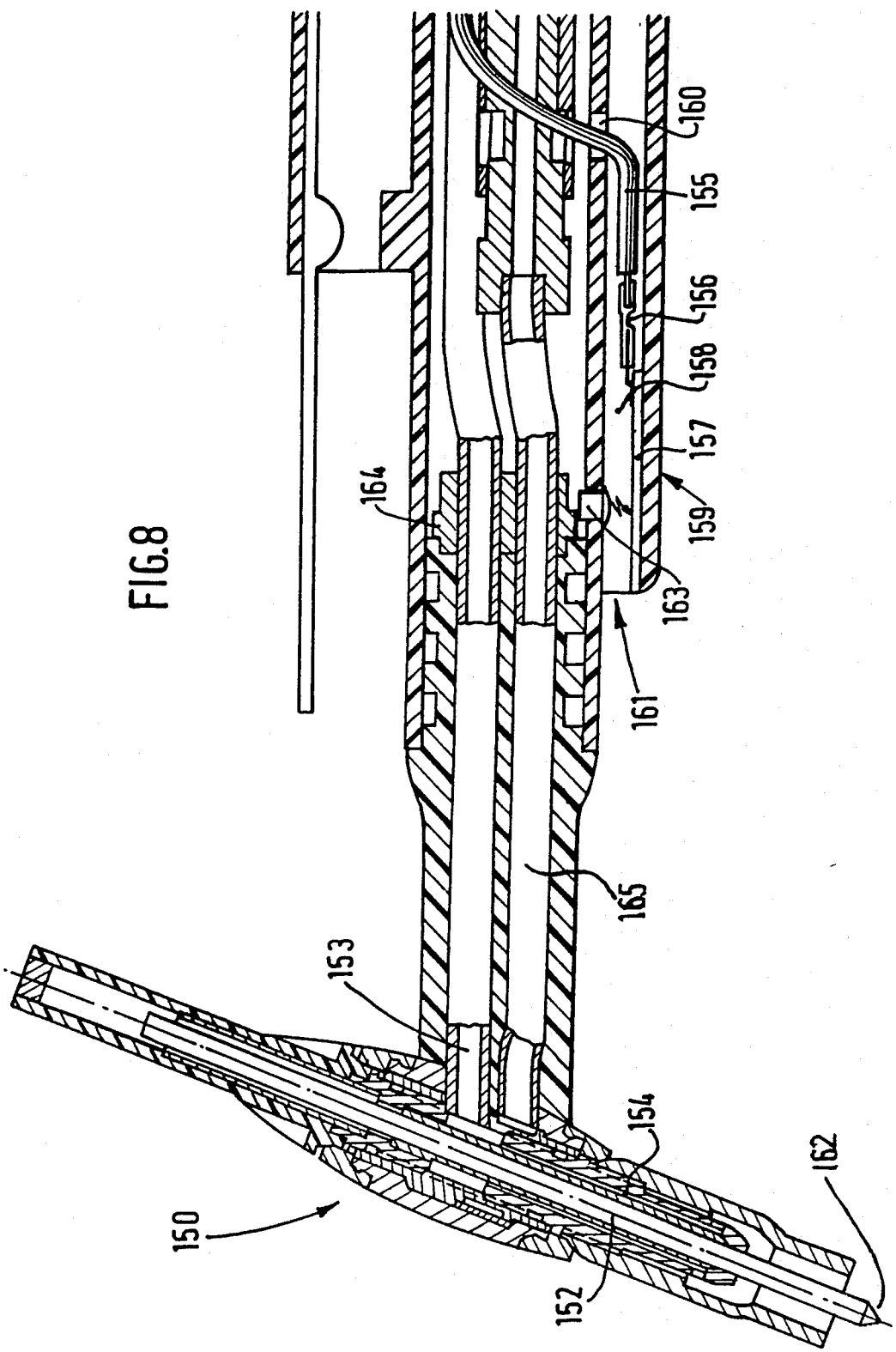

Generally, it has been found that, in the course of tests, irrespective of the electric diagram employed, the construction of the spark gap and its position have an enormous effect on the efficiency of the system. Indeed:

the efficiency diminishes when the distance between the spark gap and the space to be ionized becomes excessive;

any interposition of an object (conductor or insulator) between the spark gap and the space to be ionized results in a notable reduction in the ionizing spark;

a spark gap orthogonal to the direction of the handle, as shown in FIG. 8, gives much better results than a spark gap arranged parallel to the handle.

We claim:

1. A process for striking an arc in an electric welding or cutting torch having a torch body with a refractory electrode and conductor means for supplying current to the refractory electrode, the process comprising producing at said refractory electrode an ionizing discharge of high-voltage electric pulses forming at least one spark from a remotely located pulse generator of the electronic ignitor type employing a capacitive electric charge dischargeable into a step-up voltage transformer, connecting the electronic ignitor to the refractory electrode conductor means, and inserting a spark gap in the discharge circuit of said electronic ignitor; the distance between the electronic ignitor and the body of the torch being less than about 8 metres, the distance between said spark gap and said refractory electrode being less than 0.5 meter, the spark gap being located in the torch body.

2. A process for striking an arc in an electric welding or cutting torch having a torch body with a refractory electrode, the process comprising producing at said refractory electrode an ionizing discharge of high-voltage electric pulses forming at least one spark from a remotely located pulse generator of the electronic ignitor type employing a capacitive electric charge dischargeable into a step-up voltage transformer, and inserting a spark gap in series in the discharge circuit of said electronic ignitor, the distance between the electronic ignitor and the body of the torch being less than about 8 metres, the spark gap being arranged in a cavity of the torch body, the torch body having an opening in the region of the spark gap and in facing relation to the space to be ionized.

3. An electric welding or cutting torch, of the type comprising a torch body having a housing integral therewith and a refractory electrode, an annular conduit coaxial to said electrode for a gas, a cable assembly including a first end connected to said electrode and said conduit and a remote end, said cable assembly having a maximum length of 8 metres and including an electric cable, an electronic ignitor located at the remote end of said cable assembly, and means defining a spark gap in series with said electronic ignitor, the spark gap being located in said housing integral with the torch body, said housing having an opening to the exterior in the region of the spark gap.

4. A welding or cutting torch according to claim 3, characterised in that the opening of the housing is substantially in facing relation to the outer end of the torch electrode.

5. An electric welding or cutting torch according to claim 3, the means for defining said spark gap comprising a pair of igniting electrodes and said electronic ignitor having a pair of output terminal directly connected to the respective igniting electrodes, said refractory electrode having a tip protruding from said housing, said opening in said housing being in facing relationship with said tip.

6. An electric welding or cutting torch, of the type comprising a torch body with a refractory electrode and a torch nozzle having a free edge, an annular conduit coaxial to said electrode for a gas, a cable assembly including a first end connected to said electrode and a remote end, said cable assembly having a maximum length of 8 metres and including an electric cable, an electronic ignitor located at the remote end of said cable assembly, and a conductive member around the free edge of the torch nozzle at a predetermined distance from the free edge of said nozzle, said conductive member and said free edge defining a spark gap in series with said electronic ignitor.

7. An electric welding or cutting torch, of the type comprising a torch body with a refractory electrode and a torch nozzle having a terminal end, an annular conduit coaxial to said electrode for a gas, a cable assembly including a first end connected to said electrode and a remote end, said cable assembly having a maximum length of 8 metres and including an electric cable, an electronic ignitor located at the remote end of said cable assembly, means defining a spark gap in series with said electronic ignitor, and a conductive ring around the terminal end of the torch nozzle, the spark gap defining means being connected to said ring.

* * * * *